United States Patent [19]
Nishii et al.

[11] Patent Number: 5,320,789
[45] Date of Patent: Jun. 14, 1994

[54] SURFACE MODIFICATION OF FLUORINE RESIN WITH LASER LIGHT

[75] Inventors: Masanobu Nishii, Kyoto; Nobutake Suzuki, Gunma; Shunichi Sugimoto, Osaka; Yoshiro Hirajima, Osaka; Masao Endo, Osaka; Tomohiro Nagase, Osaka, all of Japan

[73] Assignees: Japan Atomic Energy Research Institute, Tokyo; Kurashiki Boseki Kabushiki Kaisha, Okayama, both of Japan

[21] Appl. No.: 971,089

[22] Filed: Nov. 4, 1992

[30] Foreign Application Priority Data

Nov. 6, 1991 [JP] Japan ................. 3-289999
Jun. 5, 1992 [JP] Japan ................. 4-145595

[51] Int. Cl.$^5$ .............................. B29C 71/04
[52] U.S. Cl. ..................... 264/22; 264/29.1; 264/122; 264/127; 264/158
[58] Field of Search .......... 264/22, 1.4, 127, 122, 264/158, 29.1; 427/294

[56] References Cited

U.S. PATENT DOCUMENTS

| | | | |
|---|---|---|---|
| 4,753,863 | 6/1988 | Spanjer | 264/22 |
| 5,051,312 | 9/1991 | Allmer | 264/22 |
| 5,192,580 | 3/1993 | Blanchet-Fincher | 427/294 |

FOREIGN PATENT DOCUMENTS

| | | | |
|---|---|---|---|
| 3-76630 | 4/1991 | Japan . | |
| 3-172330 | 7/1991 | Japan | 264/22 |
| 3-57143 | 8/1991 | Japan . | |
| 3-269024 | 11/1991 | Japan . | |

Primary Examiner—Jeffery Thurlow
Attorney, Agent, or Firm—Banner, Birch, McKie and Beckett

[57] ABSTRACT

A method for surface modification of a fluorine resin by irradiating the surface of the fluorine resin containing a heat-resistant light-absorbing polymeric material and/or a light-absorbing material is with laser light. Surface properties of the fluorine resin molded articles, particularly adhesion and wetting properties, can be greatly improved by a simple operation with high efficiency.

15 Claims, 1 Drawing Sheet

SURFACE MODIFICATION OF FLUORINE RESIN WITH LASER LIGHT

This applications claims the priority of Japanese Patent Applications Nos. 3-289999 filed Nov. 6, 1991, and 4-145595 filed Jun. 5, 1992, which are incorporated herein by reference.

FIELD OF THE INVENTION:

This invention relates to a method for surface modification of a chemically inactive fluorine resin. More particularly, it relates to a surface modification method comprising irradiating a laser light on the surface of a fluorine resin containing a light-absorbing material and/or a heat-resistant light-absorbing polymeric material to improve adhesion and wetting properties and, in addition, abrasion resistance, heat conductivity, antistatic properties, low frictional properties and resistance to cold flow. The method is widely applicable to fluorine resins to be laminated with various metals or polymeric materials to provide precision machinery components, electronic equipment parts, constructional materials and vibration dampers.

BACKGROUND OF THE INVENTION:

Fluorine resins have such excellent heat resistance, chemical resistance and electrical characteristics that can never be obtained from other synthetic resins. However, because of their inactive surface, they have poor receptivity to adhesives, coatings or inks and are thus difficult to combine with other materials. Several surface treating method have hitherto been proposed for activating the surface of fluorine resins as disclosed, for example, in (1) E. R. Nelson, et al., *Ind. Eng. Chem.*, 50, 329 (1958), (2) Tsunoda and Koishi, *Kogyo Zairyo*, 29 (2), 105 (1981), (3) Japanese Patent Publication No. 53-22108, and (4) Japanese Patent Publication No. 2-196834. Attention is now given to these known methods.

Method (1) is a current spread method. This method involves various operational problems arising from use of hazardous chemicals such as sodium metal and tetrahydrofuran. That is, (i) there is a danger of fire during the treatment; (ii) much care should be taken after the treatment in handling the waste solution containing complexes; (iii) the treating solution has a short working life; and (iv) fears are entertained as to environmental pollution. Besides, the treated surface undergoes a great reduction in adhesion when exposed to sunlight or heat for a long time.

Method (2) is disadvantageous in that the effect of the surface treatment on a fluorine resin is considerably lower than that obtained on polymers containing no fluorine, such as polyethylene.

Method (3), which forms unevenness on the surface of a fluorine resin, does not produce any functional group, so that the effect of surface modification is insufficient for application of adhesives having low fluidity. Further, the surface unevenness is readily lost by friction so that care should be taken in handling. Furthermore, since an apparatus to be used for the surface modification includes the vacuum system, it is large scale and the treatment speed is slow, resulting in poor productivity. In addition, a resinous component resulting from etching tends to be deposited on inner walls of the apparatus.

Method (4) uses $B(CH_3)_3$ or $Al(CH_3)_3$ so that the laser light irradiation should be conducted in a closed system or a reduced pressure system. As a result, the apparatus to be used is large scale, resulting in poor productivity. Moreover, these gases are highly toxic, restricting the working environment and requiring much care in handling.

In addition, since a fluorine resin generally has a very low absorption coefficient to ultraviolet and visible light, it is very difficult to induce a surface chemical reaction even when irradiated with ultraviolet light of high intensity such as a KrF excimer laser beam.

SUMMARY OF THE INVENTION:

It is therefore an object of the present invention to provide a method for surface modifying a fluorine resin to greatly improve adhesion and wetting properties thereof.

It is another object of the present invention to provide a molded article of fluorine resin which has a chemically reactive surface.

The present invention provides a method for surface modifying a fluorine resin which comprises irradiating laser light on the surface of a fluorine resin containing a heat-resistant light-absorbing polymeric material.

The present invention also provides a method for surface modifying a fluorine resin which comprises irradiating laser light on the surface of a fluorine resin containing a light-absorbing material.

In a preferred embodiment of the present invention, a fluorine resin is mixed with a heat-resistant light-absorbing polymeric material and then molded to form a molded article, and laser light is irradiated on the surface of the resulting molded article.

In an another preferred embodiment of the present invention, the light-absorbing material is resistant to molding temperatures of the fluorine resin, and the fluorine resin is mixed with such a light-absorbing material and then molded to form a molded article, and laser light is irradiated on the surface of the resulting molded article.

The fluorine resin to be surface modified may contain both the light-absorbing material and the heat-resistant light-absorbing polymeric material.

DETAILED DESCRIPTION OF THE INVENTION

Figure 1:
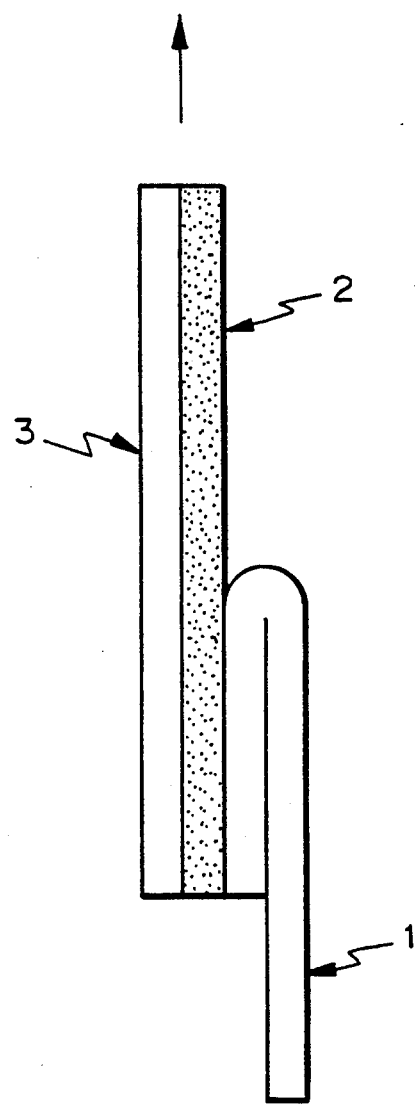
FIG. 1 illustrates a method of a peel test on a sample prepared in accordance with the method of the present invention.

The terminology "fluorine resin" as used herein means an organic polymeric material containing fluorine atoms. Suitable but non-limiting examples of fluorine resins which are the subject of surface modification according to the present invention include poly(tetrafluoroethylene) (hereinafter abbreviated as PTFE), poly(tetrafluoroethylene-co-perfluoroalkoxyethylene) (hereinafter abbreviated as PFA), poly(tetrafluoroethylene-co-hexafluoropropylene) (hereinafter abbreviated as FEP), poly(tetrafluoroethylene-co-hexafluoropropylene-co-perfluoroalkoxyethylene) (hereinafter abbreviated as EPE), poly(tetrafluoroethylene-co-ethylene) (hereinafter abbreviated as ETFE), poly(chlorotrifluoroethylene) (hereinafter abbreviated as PCTFE), poly(chlorotrifluoroethylene-co-ethylene) (hereinafter abbreviated as ECTFE), poly(vinylidene fluoride)

(hereinafter abbreviated as PVDF), poly(vinyl fluoride) (hereinafter abbreviated as PVF) and mixtures comprising two or more thereof in an arbitrary mixing ratio.

The heat-resistant light-absorbing polymeric material which can be used in the present invention are polymeric materials capable of absorbing light of the ultraviolet to visible region and resistant to the molding temperature of a fluorine resin. Specific examples of such polymeric materials are whole aromatic polyester, poly(ether ether ketone) (hereinafter abbreviated as PEEK), polyimide (hereinafter abbreviated as PI), poly(ether ketone), poly(phenylene sulfide), aromatic polyamide, polyarylate, poly(ether imide), poly(amide imide), polysulfone, poly(ether sulfone) and mixtures comprising two or more thereof in an arbitrary mixing ratio. The heat-resistant light-absorbing polymeric material is typically used in the form of powder.

The light-absorbing materials which can be used in the present invention are materials capable of absorbing light of the ultraviolet to visible region and preferably resistant to the molding temperature of a fluorine resin. Such light-absorbing materials preferably include carbon family elements or compounds thereof, metal oxides, metal sulfides, and mixtures thereof.

The light-absorbing material is not particularly limited in its form and may be used, for example, as fiber or powder. In the case of using a powder, the powder preferably has a particle size of not more than about 30 microns.

While not limited thereto, the carbon family elements or compounds thereof preferably include carbon powder, carbon fiber, graphite and silicon powder. Silicon may be either crystalline or amorphous.

While not being limited thereto, the metal oxides or sulfides preferably include zinc oxide, zirconia, titanium dioxide and molybdenum disulfide.

The method of the present invention comprises irradiating laser light on the surface of a fluorine resin containing the above-mentioned heat-resistant light-absorbing polymeric material and/or light-absorbing material. Laser light irradiation may be performed after molding a mixture of the fluorine resin and the heat-resistant light-absorbing polymeric material and/or light-absorbing material.

The light-absorbing material is preferably used in an amount of at least about 1% by weight, more preferably from about 3 to 33% by weight, and most preferably from about 5 to 30% by weight, based on the total weight of the fluorine resin and the light-absorbing material.

If desired, the fluorine resin to be treated may further contain inorganic additives such as glass fiber or bronze powder for providing the fluorine resin with abrasion resistance.

The laser light which can be used in the present invention is not particularly limited. Ultraviolet or visible laser light is preferably used. Ultraviolet laser light having a wavelength of not more than 400 nm is suitable. In particular, KrF (wavelength: 248 nm) or ArF (wavelength: 193 nm) excimer laser light with which high output is maintained in a stable state for a long time is preferred. Other ultraviolet laser light, for example, XeF excimer laser light, may also be used.

Laser light irradiation is usually carried out in the atmosphere at room temperature. If desired, it may be carried out under reduced pressure or in an oxygen atmosphere and/or under heating or cooling. The conditions of laser light irradiation vary depending on the kind of fluorine resin to be treated, the heat-resistant light-absorbing polymeric material and the light-absorbing material, if desired the fluence is about 20 $mJ/cm^2$/pulse or more, and the shot number is up to about 1000.

Mixing of a fluorine resin and the heat-resistant light-absorbing polymeric material and/or the light-absorbing material, and molding of the mixture can be carried out by any of the known means. For example, where carbon powder is used as a light-absorbing material, fluorine resin powder and carbon powder are dry blended by means of a mixing machine, e.g., a tumbling mixer or a Henschel mixer, and the mixed powder is molded in a mold under a pressure of from about 160 to 500 $kg/cm^2$ to obtain a preform. The preform is subjected to sinter molding to form a molded article by a free baking method in which the preform is sintered in a hot air heating furnace at a sintering temperature of from about 360° to 380° C., a hot molding method in which the preform is sintered in a mold or a continuous molding method using a ram extruder. Then, the surface of the resulting molded article is irradiated with laser light for surface modification.

In employing a heat-fusible fluorine resin such as PFA, a general molding method may be adopted. For example, where carbon powder is used as a light-absorbing material, a heat-fusible fluorine resin and carbon powder are dry blended in a mixing machine, e.g., a tumbling mixer or a Henschel mixer, and the mixture is pelletized by means of an extruder. The mixture may be kneaded by means of, for example, a roll mill or a Banbury mixer and pelletized by means of a sheet pelletizer. The resulting blend pellets are molded into a rod, tubing or film by means of an injection molding apparatus or an extruder. The resulting molded article is then irradiated with laser light for surface modification.

The mechanism of surface modification according to the present invention may be described for as follows. The laser light of high intensity is rapidly absorbed into the heat-resistant light-absorbing polymeric material and/or light-absorbing material contained in the fluorine resin. The energy absorbed is transferred to the fluorine resin or induces ablation whereby the fluorine atoms in the fluorine resin surface are effectively released to cause chemical reactions such as formation of a carbon-to-carbon double bond (C=C), formation of a carbonyl group through reaction with oxygen and surface carbonization. The thus formed C=C bond or carbonyl group is chemically active to produce a chemical bonding force or an intermolecular force. The surface carbonization results in formation of an uneven surface to produce a mechanical anchoring effect. As a result, the adhesion and wetting properties of the surface are significantly improved. The formation of a C=C bond or a carbonyl group and surface carbonization may be confirmed by, for example, X-ray photoelectron spectroscopy (XPS).

According to the present invention in which a fluorine resin molded article is irradiated with high intensity laser light, the desired surface modification can be achieved effectively within a short time without hazard chemicals. Since the surface treatment can be effected in the atmosphere at room temperature, the operation becomes very simple. Furthermore, the fluorine resin surface thus provided with improved adhesion property exhibits higher weather resistance (e.g., resistance to sunlight) and higher heat resistance as compared with the fluorine resin treated by conventional methods. Further, according to the present invention, not only adhesion and wetting properties but also other excellent characteristics such as abrasion resistance, heat conductivity, antistatic properties, low frictional properties and resistance to cold flow are imparted to fluorine resins. Therefore, the present invention heightens the added value of fluorine resin molded articles and makes it feasible to produce composite materials of a fluorine resin with other various materials, thus broadening the application of fluorine resin.

The present invention is now illustrated in greater detail with reference to Examples below, but it should be understood that the present invention is not construed as being limited thereto. All the parts are by weight unless otherwise indicated.

EXAMPLE 1

Ninety-five parts of PTFE powder having a particle size of from 10 to 30 microns ("Fluon G-163" manufactured by Asahi-ICI Fluoropolymers) and five parts of whole aromatic polyester ("Ekonol E-101S" manufactured by Sumitomo Chemical, Osaka, Japan) were dry blended in a Henschel mixer. The blend was introduced into a mold having a diameter of 135 mm and pressed at 320 kg/cm$^2$ to obtain a preform having an outer diameter of 135 mm, an inner diameter of 75 mm and a height of 100 mm. The preform was sintered in a hot air heating furnace at a temperature of 360° C. for 3 hours and then gradually cooled to room temperature to obtain a sinter molded article. The molded article was skived with a skiving machine to prepare a 300 microns thick, 30 mm wide and 150 mm long samples.

Each of the samples was thoroughly rinsed with ethanol, dried in air and set in a sample holder. A KrF excimer laser beam (wavelength: 248 nm; fluence: 101 mJ/cm$^2$/pulse; 662 shots) from an excimer laser ("Hyper EX-460" manufactured by Lumonics, Inc., Ontario, Canada) was irradiated onto the sample through a mask so that an area of 30 mm in width and 15 mm in length might be irradiated, at room temperature in the atmosphere, with the laser's optical axis being at the center of the sample. A quartz-made concave lens was set between the excimer laser and the mask. The fluence of the laser beam was controlled by adjustment of the distance of the lens from the sample and measured with a power meter manufactured by Scientech, Inc. The formation of a C=C bond and a carbonyl group and surface carbonization was confirmed by XPS ("ESCA 850S" manufactured by Shimadzu, Kyoto, Japan).

The peel strength of each of the samples (both irradiated and unirradiated) was measured as follows. An epoxy resin adhesive ("Bond E Set Cleaner" produced by Konishi Co., Ltd.) was applied to a stainless steel plate and the sample (30 mm × 150 mm × 300 microns), and the adhesive-applied surfaces were bonded together. The stainless steel plate was 25 mm wide, 150 mm long and 300 microns thick. After a weight (3 kg, 6 cm × 6 cm at the bottom) was put on the assembly for at least 12 hours, the sample was pulled from the assembly at a speed of 10 mm/min at a peel angle of 180 degrees by means of a tensile tester ("Autograph P-100" manufactured by Shimadzu Kyoto, Japan), as shown in FIG. 1. In FIG. 1, reference numeral 1 is the sample, reference numeral 2 the adhesive and reference numeral 3 the stainless steel plate. The peel strength of the irradiated sample was 7.5 kg/25 mm, which was significantly greater than that of the unirradiated sample, 0.1 kg/25 mm, resulting in a great improvement in adhesion property of the fluorine resin molded article treated in accordance with the method of the present invention.

The wetting index of each of the samples (both irradiated and unirradiated) was measured in accordance with JIS K-6768 as follows. A series of mixed liquids having a stepwise varying surface tension were applied to each of the samples, and the surface tension of a liquid with which the sample was judged to be wetted was taken as a wetting index. As a result, the wetting index of the irradiated sample was 44 dyn/cm, whereas that of the unirradiated sample was less than 31 dyn/cm, resulting in a great improvement in the wetting property of the fluorine resin molded article treated in accordance with the method of the present invention.

The heat resistance, chemical resistance and electrical characteristics of the samples were also evaluated. As a result, it was proved that these properties of the irradiated sample were substantially equal to those of the unirradiated sample.

EXAMPLES 2 TO 14

Irradiated and unirradiated samples were prepared in the same manner as in Example 1, except for changing the kind of the heat-resistant light-absorbing polymeric material, the mixing ratio of the PTFE powder and the heat-resistant light-absorbing polymeric material and the laser irradiation conditions as shown in Table 1 below. The resulting samples were evaluated in the same manner as in Example 1. The results obtained are shown in Table 1.

EXAMPLE 15

Eighty parts of PFA pellets ("Neoflon AP-210" manufactured by Daikin Industries, Osaka, Japan) and twenty parts of poly(ether ether ketone) ("Victrex PEEK 150-P" manufactured by ICI) were mixed in a Henschel mixer. The mixture was extruded using a twin-screw extruder at a cylinder temperature of 370° C. and the extrudate was pelletized. The resulting pellets were kneaded in a single-screw extruder at a cylinder temperature of 360° C. and extruded through a T-die to obtain a 300 micron thick film.

The film was irradiated with an excimer laser beam under the same conditions as in Example 1. The irradiated and unirradiated films were evaluated in the same manner as in Example 1. The results obtained are shown in Table 1.

COMPARATIVE EXAMPLE 1

A PTFE sample containing no heat-resistant light-absorbing polymeric material was prepared in the same manner as in Example 1. The sample was irradiated with a laser beam under the same conditions as in Example 1 and evaluated in the same manner as in Example 1. The results of the evaluation are shown in Table 1. It is seen that no improvement in adhesion and wetting properties was obtained.

COMPARATIVE EXAMPLE 2

A PFA sample containing no heat-resistant light-absorbing polymeric material was prepared in the same manner as in Example 1. The sample was irradiated with a laser beam under the same conditions as in Example 15 and evaluated in the same manner as in Example 1. The results of the evaluation are shown in Table 1. The results of the evaluation are shown in Table 1. It is seen that no improvement in adhesion and wetting properties was obtained.

EXAMPLE 16

Ninety-five parts of PTFE powder having a particle size of from 10 to 30 microns ("Fluon G-163") and 5 parts of carbon powder having a 90% diameter of 30 microns or less ("Carbon Black FD-0721" manufactured by Dainichi Seika Colour & Chemicals Mfg., Tokyo, Japan) were dry blended in a Henschel mixer. The blend was introduced into a mold having a diameter of 135 mm and the mold was pressed at 320 kg/cm$^2$ to obtain a preform having an outer diameter of 135 mm, an inner diameter of 75 mm and a height of 100 mm. The preform was sintered in a hot air heating furnace at 360° C. for 3 hours and then gradually cooled to room temperature to obtain a sinter molded article. The molded article was skived with a skiving machine to prepare 300 microns thick, 30 mm wide and 150 mm long samples.

The sample was irradiated with a laser beam under the same conditions as in Example 1. The irradiated and unirradiated samples were subjected to peel test in the same manner as in Example 1. The results obtained are shown in Table 2 below.

The heat resistance, chemical resistance and electrical characteristics of the irradiated sample were found to be substantially equal to those of the unirradiated sample.

EXAMPLES 17 TO 32

Each of the irradiated and unirradiated samples was prepared in the same manner as in Example 16, except for changing the kind of light-absorbing material, the mixing ratio of the PTFE powder and the light-absorbing material, and the laser irradiation conditions as shown in Table 2 or 3 below, except that an ArF excimer laser was used in Example 26 instead of the KrF excimer laser. The resulting samples were evaluated in the same manner as in Example 16. The results obtained are shown in Tables 2 and 3.

COMPARATIVE EXAMPLES 3 AND 4

A PTFE sinter molded article was prepared in the same manner as in Example 16, except that neither light-absorbing material nor heat-resistant light-absorbing polymeric material was used. The resulting sample was irradiated with a laser beam under the conditions shown in Table 2, and the evaluation was made in the same manner as in Example 16. The results obtained are shown in Table 2. As is apparent from Table 2, the laser beam irradiation brought about no improvement in adhesion property at all. The wetting index of the sample was not more than 31 dyn/cm either before or after the irradiation, indicating that no improvement in wetting property was obtained by the irradiation.

While the invention has been described in detail and with reference to specific examples thereof, it will be apparent to one skilled in the art that various changes and modifications can be made therein without departing from the spirit and scope thereof.

TABLE 1

| Example | Composition (wt %) | | | | | Laser Irradiation Conditions | | | Peel Strength (kg/25 mm) | | Wetting Index (dyn/cm) | |
|---|---|---|---|---|---|---|---|---|---|---|---|---|
| | polyester[1] | PEEK[2] | PI[3] | PTFE | PFA | Excimer Laser | fluence mJ/cm$^2$/pulse | shot number | after irradiation | before irradiation | after irradiation | before irradiation |
| 1 | 5 | 0 | 0 | 95 | 0 | KrF | 101 | 662 | 7.5 | 0.1 | 44 | <31 |
| 2 | 20 | 0 | 0 | 80 | 0 | KrF | 61 | 880 | 5.0 | 0.6 | 52 | 31 |
| 3 | 20 | 0 | 0 | 80 | 0 | KrF | 170 | 12 | 4.7 | 0.6 | 52 | 31 |
| 4 | 1 | 0 | 0 | 99 | 0 | KrF | 61 | 880 | 1.5 | 0.1 | 31 | <31 |
| 5 | 0 | 15 | 0 | 85 | 0 | KrF | 101 | 622 | 7.2 | 0.5 | 52 | 35 |
| 6 | 0 | 15 | 0 | 85 | 0 | KrF | 113 | 375 | 8.3 | 0.5 | 52 | 35 |
| 7 | 0 | 5 | 0 | 95 | 0 | KrF | 113 | 375 | 2.9 | 0.1 | 52 | <31 |
| 8 | 0 | 0 | 15 | 85 | 0 | KrF | 101 | 622 | 3.8 | 0.9 | 52 | 31 |
| 9 | 0 | 0 | 15 | 85 | 0 | KrF | 113 | 375 | 4.0 | 0.9 | 52 | 31 |
| 10 | 0 | 0 | 5 | 95 | 0 | KrF | 113 | 375 | 3.6 | 0.4 | 52 | <31 |
| 11 | 5 | 0 | 0 | 95 | 0 | ArF | 37 | 1450 | 2.0 | 0.1 | 52 | <31 |
| 12 | 0 | 15 | 0 | 85 | 0 | ArF | 37 | 1450 | 2.8 | 0.5 | 52 | 35 |
| 13 | 0 | 0 | 15 | 85 | 0 | ArF | 37 | 1450 | 1.7 | 0.9 | 52 | 31 |
| 14 | 0 | 15 | 0 | 85 | 0 | XeF | 40 | 1200 | 1.2 | 0.5 | 35 | 32 |
| 15 | 0 | 20 | 0 | 0 | 80 | KrF | 64 | 900 | 2.3 | 0.5 | — | — |
| Comp. 1 | 0 | 0 | 0 | 100 | 0 | KrF | 21 | 7000 | 0.1 | <0.03 | <31 | <31 |
| Comp. 2 | 0 | 0 | 0 | 0 | 100 | KrF | 64 | 880 | <0.03 | <0.03 | <31 | <31 |

[1]Ekonol E-101S (Sumitomo Chemical)
[2]Victrex PEEK 150-P (ICI)
[3]Aurum (Mitsui Toatsu Chemicals)

TABLE 2

| Example | Composition (wt %) | | | | | | Laser Irradiation Conditions | | | Peel Strength (kg/25 mm) | |
|---|---|---|---|---|---|---|---|---|---|---|---|
| | PTFE | CA[1] | CF[2] | Gr[3] | ZO[4] | PO[5] | Excimer Laser | fluence mJ/cm$^2$/pulse | Shot number | after irradiation | before irradiation |
| 16 | 95 | 5 | 0 | 0 | 0 | 0 | KrF | 152 | 340 | 5.3 | 0.05 |
| 17 | 95 | 5 | 0 | 0 | 0 | 0 | KrF | 152 | 100 | 4.0 | 0.05 |
| 18 | 95 | 5 | 0 | 0 | 0 | 0 | KrF | 152 | 700 | 5.2 | 0.05 |
| 19 | 99 | 1 | 0 | 0 | 0 | 0 | KrF | 152 | 100 | 2.4 | 0.03 |
| 20 | 99 | 1 | 0 | 0 | 0 | 0 | KrF | 152 | 340 | 2.4 | 0.03 |
| 21 | 99 | 1 | 0 | 0 | 0 | 0 | KrF | 152 | 700 | 2.6 | 0.03 |
| 22 | 90 | 0 | 10 | 0 | 0 | 0 | KrF | 170 | 180 | 1.1 | 0.50 |
| 23 | 85 | 0 | 0 | 15 | 0 | 0 | KrF | 170 | 180 | 1.7 | 0.25 |

TABLE 2-continued

| Example | Composition (wt %) | | | | | | Laser Irradiation Conditions | | | Peel Strength (kg/25 mm) | |
|---|---|---|---|---|---|---|---|---|---|---|---|
| | PTFE | CA[1] | CF[2] | Gr[3] | ZO[4] | PO[5] | Excimer Laser | fluence mJ/cm$^2$/pulse | Shot number | after irradiation | before irradiation |
| 24 | 67 | 3 | 0 | 30 | 0 | 0 | KrF | 170 | 180 | 4.0 | 1.9 |
| 25 | 85 | 0 | 10 | 0 | 0 | 5 | KrF | 152 | 340 | 9.2 | 1.1 |
| 26 | 97 | 0 | 0 | 0 | 3 | 0 | ArF | 103 | 400 | 1.0 | 0.03 |
| Comp. 3 | 100 | 0 | 0 | 0 | 0 | 0 | KrF | 153 | 1000 | <0.03 | <0.03 |
| Comp. 4 | 100 | 0 | 0 | 0 | 0 | 0 | ArF | 92 | 550 | 0.04 | <0.03 |

[1] carbon powder "Carbon Black FD-0721" (Dainichi Seika Colour & Chemicals Mfg.)
[2] carbon fiber "Donacarbo SG-249" (Osaka Gas)
[3] graphite "ACP" (Nippon Kokuen Kogyo)
[4] zinc oxide "FINEX-25" (Sakai Chemical Industry)
[5] heat-resistant light-absorbing polymeric material "Ekonol E-101S" (Sumitomo Chemical)

TABLE 3

| Example | Composition (wt %) | | Laser Irradiation Conditions | | | Peel Strength (kg/25 mm) | |
|---|---|---|---|---|---|---|---|
| | PTFE | Light-Absorbing material | Excimer Laser | fluence mJ/cm$^2$/pulse | Shot number | after irradiation | before irradiation |
| 27 | 95 | ZnO 5 | KrF | 300 | 12 | 1.3 | 0.1 |
| 28 | 95 | TiO$_2$ 5 | KrF | 300 | 9 | 1.0 | 0.1 |
| 29 | 95 | ZrO$_2$ 5 | KrF | 300 | 24 | 1.0 | 0.1 |
| 30 | 95 | MoS$_2$ 5 | KrF | 300 | 36 | 4.3 | 0.2 |
| 31 | 95 | Si (crystalline) 5 | KrF | 300 | 12 | 2.4 | 0.2 |
| 32 | 95 | Si (amorphous) 5 | KrF | 300 | 12 | 1.9 | 0.1 |

What is claimed is:

1. A method for surface modifying a molded fluorine resin to improve the adhesion properties thereof comprising irradiating laser light on the surface of a fluorine resin containing a heat-resistant light-absorbing polymeric material which absorbs light of the ultraviolet to visible region and is resistant to the molding temperature of the fluorine resin.

2. The method as claimed in claim 1, wherein a fluorine resin is mixed with said heat-resistant light-absorbing polymeric material, the mixture is molded to form a molded article, and laser light is irradiated on the surface of the molded article.

3. The method as claimed in claim 1, wherein said heat-resistant light-absorbing polymeric material is selected from the group consisting of whole aromatic polyester, poly(ether ether ketone), polyimide, poly(ether ketone), poly(phenylene sulfide), aromatic polyamide, polyarylate, poly(ether imide), poly(amide imide), polysulfone, poly(ether sulfone) and a mixture thereof.

4. The method as claimed in claim 1, wherein said laser light is ultraviolet laser light.

5. The method as claimed in claim 4, wherein said ultraviolet laser light is light of an ArF excimer laser, a KrF excimer laser or a XeF excimer laser.

6. A method for surface modifying a molded fluorine resin to improve the adhesive properties thereof comprising irradiating laser light on the surface of a fluorine resin containing a light-absorbing material selected from the group consisting of carbon family elements or compounds thereof, metal oxides, metal sulfides and mixtures thereof, wherein said light-absorbing material is present in an amount of from about 1 to 33% by weight based on the total weight of the fluorine resin and the light-absorbing material.

7. The method as claimed in claim 6, wherein said light-absorbing material is a heat-resistant material withstanding the molding temperature of the fluorine resin, and the fluorine resin is mixed with said light-absorbing material, the mixture is molded to form a molded article, and laser light is irradiated on the surface of the molded article.

8. The method as claimed in claim 6, wherein said fluorine resin further contains a heat-resistant light-absorbing polymeric material which absorbs light of the ultraviolet to visible region and is resistant to the molding temperature of the fluorine resin.

9. The method as claimed in claim 8, wherein said heat-resistant light-absorbing polymeric material is selected from the group consisting of whole aromatic polyester, poly(ether ether ketone), polyimide, poly(ether ketone), poly(phenylene sulfide), aromatic polyamide, polyarylate, poly(ether imide), poly(amide imide), polysulfone, poly(ether sulfone) and mixtures thereof.

10. The method as claimed in claim 1, wherein said heat-resistant light-absorbing polymeric material is present in an amount of from about 1 to about 20% by weight based on the total weight of the fluorine resin and the heat-resistant light-absorbing polymeric material.

11. The method as claimed in claim 6, wherein said carbon family element or a compound thereof is carbon powder, carbon fiber, graphite or silicon powder.

12. The method as claimed in claim 6, wherein said metal oxide is zinc oxide, zirconia or titanium oxide, and said metal sulfide is molybdenum disulfide.

13. The method as claimed in claim 7, wherein said laser light is ultraviolet laser light.

14. The method as claimed in claim 13, wherein said ultraviolet laser light is light of an ArF excimer laser, a KrF excimer laser or a XeF excimer laser.

15. The method as claimed in claim 6, wherein said light-absorbing material is present in an amount of from about 3 to 33% by weight based on the total weight of the fluorine resin and the light-absorbing material.

* * * * *